United States Patent
Berry

[11] Patent Number: 5,944,429
[45] Date of Patent: Aug. 31, 1999

[54] BEARING ASSEMBLY AND SPLIT BEARING RACE FOR USE IN THE SAME

[75] Inventor: James P Berry, Derby, United Kingdom

[73] Assignee: Rolls-Royce plc, London, United Kingdom

[21] Appl. No.: 08/841,385

[22] Filed: Apr. 30, 1997

[30] Foreign Application Priority Data

May 30, 1996 [GB] United Kingdom .................. 9611231

[51] Int. Cl.[6] .................................................. F16C 33/60
[52] U.S. Cl. .......................... 384/506; 384/493; 384/499
[58] Field of Search .................................. 384/493, 499, 384/501, 502, 505, 506

[56] References Cited

U.S. PATENT DOCUMENTS

| | | | |
|---|---|---|---|
| 1,071,295 | 8/1913 | Bruhl | 384/499 |
| 1,233,476 | 7/1917 | Hughes | 384/501 X |
| 3,640,591 | 2/1972 | Eklund | |
| 4,764,153 | 8/1988 | Jacob | 464/111 |
| 4,865,472 | 9/1989 | Jacob | 384/506 X |
| 4,958,943 | 9/1990 | Nakanishi | 384/505 X |
| 5,028,150 | 7/1991 | Kronenberger | 384/476 |
| 5,106,209 | 4/1992 | Atkinson et al. | 384/506 X |

FOREIGN PATENT DOCUMENTS

| | | |
|---|---|---|
| 3825326 | 2/1990 | Germany . |
| 4200917 | 7/1993 | Germany . |
| 1274164 | 4/1971 | Guinea . |
| 1418846 | 5/1973 | United Kingdom . |
| 1419369 | 5/1973 | United Kingdom . |
| 2006887 | 10/1978 | United Kingdom . |
| 2209057 | 1/1988 | United Kingdom . |
| 2210432 | 9/1988 | United Kingdom . |

*Primary Examiner*—Thomas R. Hannon
*Attorney, Agent, or Firm*—W. Warren Taltavull; Farkas & Manelli PLLC

[57] ABSTRACT

A bearing assembly supports a shaft. The bearing assembly comprises an outer bearing race and an inner bearing race. Each bearing race has a race track in which a plurality of rolling elements are located. The inner bearing race is split into two halves. The two halves of the split bearing race are interconnected by curvic teeth. The curvic teeth constrain relative movement between the two halves of the split bearing race and maintain concentricity of the bearing race.

15 Claims, 1 Drawing Sheet

BEARING ASSEMBLY AND SPLIT BEARING RACE FOR USE IN THE SAME

THE FIELD OF THE INVENTION

The present invention relates to a bearing assembly and in particular to a bearing assembly having a split bearing race.

BACKGROUND OF THE INVENTION

Many applications require bearing assemblies to support shafts rotating at high speeds. Each bearing assembly comprises an inner and an outer bearing race each having a bearing track in which the rolling elements are located.

In known bearing assemblies at least one of the bearing races may be split for ease of assembly. A problem with bearing assemblies having a split bearing race is that high axial loads can cause the rolling elements to come into contact with a section of the split bearing race. The contact load of the rolling element causes heating of the section of the split bearing race which expands thermally and leads to loss of concentricity. High levels of vibration are then encountered due to the thermal expansion and loss of fit between this section of the bearing inner race and the shaft.

One solution to the aforementioned problems has been to increase the interference fit between the sections of the inner bearing race and the shaft. Increasing the interference fit between the inner bearing race and the shaft however causes difficulties in assembly.

SUMMARY OF THE INVENTION

The present invention seeks to provide a compact bearing assembly having at least one split bearing race which is maintained concentric reducing vibration and improving the service life of the bearing assembly and its integrity. A bearing assembly in accordance with the present invention is also tolerant to axial loads in either direction.

According to the present invention a bearing assembly comprises an inner and an outer bearing race each having a race track in which a plurality of rolling elements are located, at least one of the bearing races being split into sections, means being provided to interconnect the sections of the split bearing race to constrain relative movement therebetween and maintain concentricity of the sections of the split bearing race.

Preferably the means interconnecting the sections of the split bearing race are located in a non contact zone of the bearing race. The non contact zone of the bearing race may be defined by the repose angle of the rolling element in the race track. In the preferred embodiment of the present invention the repose angle of the rolling element is 12° either side of the bottom of the race track.

The bearing race may be split into two sections. The two sections of the split bearing race may be interconnected by curvic teeth, radial splines or dowel pegs located in slots.

A bearing assembly to this design is tolerant to axial loads in either direction.

A further aspect of the present invention is a split bearing race for use in a bearing assembly.

BRIEF DESCRIPTION OF THE DRAWINGS

The present invention will now be described with reference to the accompanying drawings in which.

DETAILED DESCRIPTION OF THE INVENTION

Figure 1:
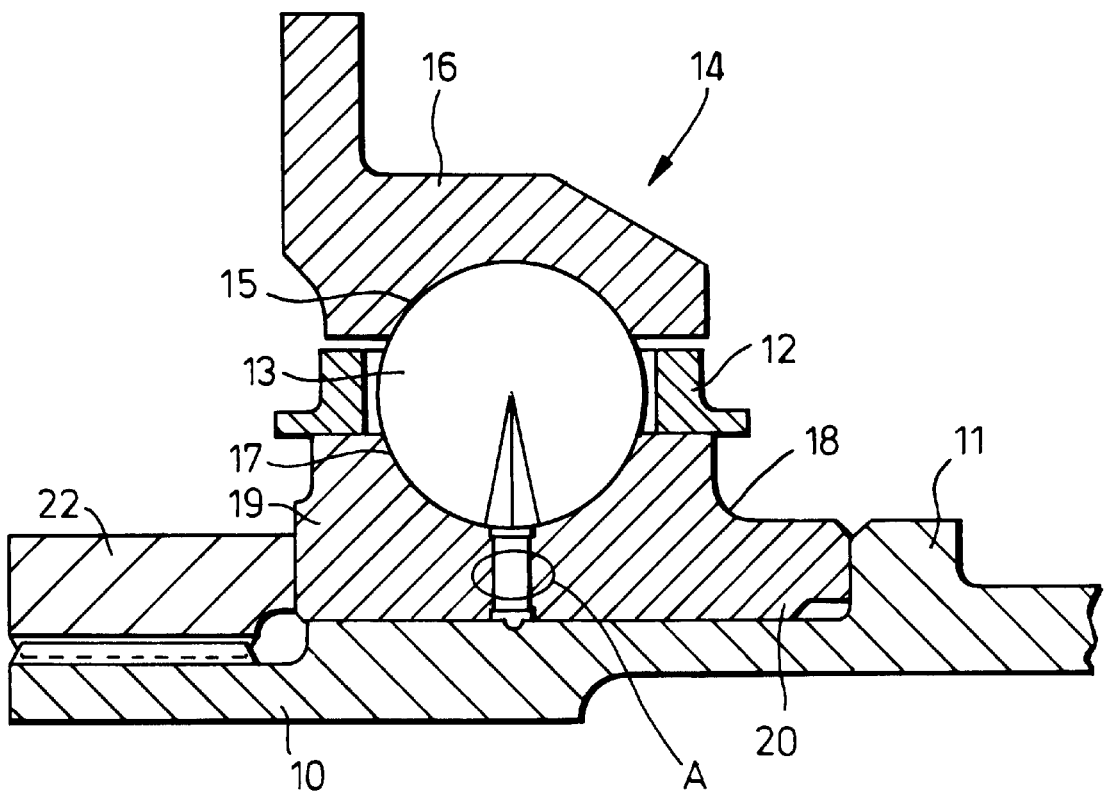
FIG. 1 is a cross-sectional view of a bearing assembly in accordance with the present invention.

Referring to FIG. 1 a bearing assembly 14 supports a shaft 10. The bearing assembly 14 comprises an outer 16 and an inner bearing race 18 each having a race track 15 and 17 in which rolling elements 13 are located. The rolling elements 13 in the present invention are ball bearings and each ball bearing is separated from the neighbouring ball bearing by a bearing cage 12.

Figure 2:
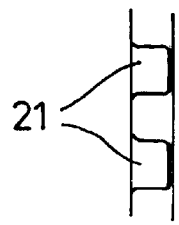
FIG. 2 is an enlarged view of area A in FIG. 1.

The outer bearing race 16 is one-piece whilst the inner bearing race 18 is split into a two sections 19 and 20. Section 20 of the inner bearing race is greater in width than section 19. The width of the section 20 is increased to act as a heat sink and to increase the amount of support from the shaft 10. The two sections, 19 and 20, of the inner bearing race 18 are interconnected by curvic teeth 21, FIG. 2. The two sections 19 and 20 of the inner bearing race 18 are located between a flange 11 on the shaft 10 and a ring nut clamp 22 which keeps the curvic teeth 21 in engagement. An interference fit exists between the two sections 19 and 20 of the inner bearing race 18 and the shaft 10.

The bearing assembly 14 is lubricated by oil. The oil also serves to cool the inner bearing race 18 to help to maintain the interference fit and concentricity of the inner bearing race 18 with the shaft 10.

In operation a rearwards axial load causes the front section 19 of the inner bearing race 18 to come into contact with the rolling element 13. The front section 19 of the inner bearing race 18 is heated by the contact with the rolling element 13. Heating of the front section 19 of the inner bearing race 18 causes it to lose its interference fit on the shaft 10 in spite of the oil cooling. The front section 19 of the inner bearing race 18 grows radially under the thermal expansion caused by the contact heating of the rolling element 13. However the curvic teeth 21 which couple the two sections 19 and 20 of the inner bearing race 18 together constrains the movement of the heated section 19. Relative movement between the two sections 19 and 20 is constrained to maintain the two sections 19 and 20 concentric.

If the axial load is reversed the rear section 20 of the inner bearing race 18 comes into contact with the ball bearing 13. The rear section 20 is heated and grows radially due to the thermal expansion. The curvic teeth 21 couple the heated section 20 to the front section 19 and constrains the movement of the heated section 20 so it remains concentric. Thus relative movement between the sections 19 and 20 is prevented reducing vibration and improving the service life of the bearing assembly 14 and its integrity.

By controlling the movement of the expanded section of the split bearing race 18 by connection to the unexpanded section the bearing assembly 14 in accordance with the present invention is tolerant to axial loads in either direction.

It will be appreciated by one skilled in the art that although in the preferred embodiment of the present invention curvic teeth 21 couple the two halves 19 and 20 of the inner bearing race 18 together other cross coupling features may be used instead. For example radial splines or dowel pegs located in slots could be used. Suitable cross coupling features must be designed to fit in the non contact zone of the inner bearing race formed by the ball repose angle. In this embodiment of the present invention the ball repose angle is approximately 12° each side of the bottom of the race track.

Although the present invention has been described with reference to a bearing assembly 14 having a split inner bearing race 18 it will be appreciated that the outer bearing race 16 could be split instead or that both of the bearing races 16 and 18 could be split. The bearing races 16 and 18 could be split into unequal sections such that the parting line between the sections is positioned in an area of minimum contact with the rolling elements 13 to minimise wear and noise.

I claim:

1. A bearing assembly comprising an inner and an outer bearing race each having a race track in which a plurality of rolling elements are located, at least one of the bearing races being split into sections, means being provided to interconnect the sections of the split bearing race to constrain relative movement therebetween and maintain concentricity of the sections of the split bearing race, at least one of the sections of the split bearing race is variable in width to dissipate heat which in operation is generated therein.

2. A bearing assembly as claimed in claim 1 in which the means interconnecting the sections of the split bearing race are located in a non contact zone of the bearing race.

3. A bearing assembly as claimed in claim 2 in which the non contact zone of the bearing race is defined by the repose angle of the rolling element in the race track.

4. A bearing assembly as claimed in claim 3 in which the repose angle of rolling element is 12° either side of the bottom of the race track.

5. A bearing assembly as claimed in claim 1 in which the means interconnecting the sections of the split bearing race are curvic teeth.

6. A bearing assembly as claimed in claim 1 in which at least one of the bearing races is split into halves.

7. A bearing assembly as claimed in claim 6 in which one half of the split bearing race is variable in width.

8. A bearing assembly as claimed in claim 1 in which an oil feed is provided to lubricate and cool the bearing assembly.

9. A split bearing race for mounting in a bearing assembly, the split bearing race having a race track in which in operation a plurality of rolling elements are located, the split bearing race comprising a plurality of sections, means being provided to interconnect the sections of the split bearing race to constrain relative movement therebetween and maintain concentricity of the sections of the split bearing race, at least one of the sections of the split bearing race is variable in width to dissipate heat which in operation is generated therein.

10. A split bearing race as claimed in claim 9 in which the means interconnecting the sections of the split bearing race are located in a non contact zone of the split bearing race.

11. A split bearing race as claimed in claim 10 in which the non contact zone of the bearing race is defined by the repose angle of the rolling element in the race track.

12. A split bearing race as claimed in claim 11 in which the repose angle of rolling element is 12° either side of the bottom of the race track.

13. A split bearing race as claimed in claim 9 in which the means interconnecting the sections of the split bearing race are curvic teeth.

14. A split bearing race as claimed in claim 9 in which the bearing race is split into halves.

15. A split bearing race as claimed in claim 14 in which one half of the split bearing race is variable in width.

* * * * *